(12) United States Patent
Geelen et al.

(10) Patent No.: US 8,525,704 B2
(45) Date of Patent: Sep. 3, 2013

(54) DISPLAYING ROUTE INFORMATION ON A DIGITAL MAP IMAGE

(75) Inventors: Pieter Geelen, Amsterdam (NL); James Tebbutt, Amsterdam (NL)

(73) Assignee: Tomtom International B.V., Amsterdam (NL)

( * ) Notice: Subject to any disclaimer, the term of this patent is extended or adjusted under 35 U.S.C. 154(b) by 409 days.

(21) Appl. No.: 12/736,406

(22) PCT Filed: May 29, 2008

(86) PCT No.: PCT/EP2008/004560
§ 371 (c)(1),
(2), (4) Date: Oct. 6, 2010

(87) PCT Pub. No.: WO2009/143869
PCT Pub. Date: Dec. 3, 2009

(65) Prior Publication Data
US 2011/0025531 A1 Feb. 3, 2011

(51) Int. Cl.
*G08G 1/133* (2006.01)
(52) U.S. Cl.
USPC .............. 340/995.27; 340/995.1; 340/995.14; 701/409; 701/436
(58) Field of Classification Search
USPC ................. 340/995.1–995.27; 701/208, 209, 701/211, 409, 423, 426, 428, 436, 458
See application file for complete search history.

(56) References Cited

U.S. PATENT DOCUMENTS

| | | | |
|---|---|---|---|
| 6,341,254 B1 | 1/2002 | Okude et al. | |
| 7,920,966 B2 * | 4/2011 | Emoto et al. | 701/436 |
| 2002/0133291 A1 * | 9/2002 | Hamada et al. | 701/208 |
| 2005/0234638 A1 * | 10/2005 | Ogaki et al. | 701/209 |
| 2006/0287819 A1 | 12/2006 | Brulle-Drews et al. | |

FOREIGN PATENT DOCUMENTS

| | | |
|---|---|---|
| EP | 1 640 690 | 3/2006 |
| EP | 1 681 538 | 7/2006 |
| JP | 9292833 A | 10/1991 |
| JP | 9318381 A | 5/1995 |
| JP | 7294278 A | 11/1995 |
| JP | 11132781 A | 5/1999 |
| JP | 2000112343 A | 4/2000 |
| JP | 2000207577 A | 7/2000 |
| JP | 2000221876 A | 8/2000 |
| JP | 2000322593 A | 11/2000 |
| JP | 2000348217 A | 12/2000 |
| JP | 2001108458 A | 4/2001 |
| JP | 2004233153 A | 8/2004 |
| JP | 2006145680 A | 6/2006 |
| JP | 2008014975 A | 1/2008 |

OTHER PUBLICATIONS

International Preliminary Report on Patentability dated Nov. 30, 2010.
International Search Report, Mar. 24, 2009.

* cited by examiner

*Primary Examiner* — Brent Swarthout (57) ABSTRACT

A method and apparatus are disclosed for generating a display image including a map view and route information, the map view being a three dimensional perspective elevation view. In at least one embodiment, the method includes: determining, from height information associated with a map object to be displayed in the display image, whether the object obscures a line of sight to the route information in the three dimensional perspective elevation; and displaying the map object in a format that is dependent on whether the map object is determined to obscure the line of sight.

14 Claims, 7 Drawing Sheets

DISPLAYING ROUTE INFORMATION ON A DIGITAL MAP IMAGE

FIELD OF THE INVENTION

This invention relates to an apparatus and method for generating a display image including route information superposed with a digital map view. The invention is especially, although not exclusively, suitable for navigation devices, including portable navigation devices (so-called PNDs).

BACKGROUND TO THE INVENTION

Typically, a navigation device is configured to display an image consisting of a map view generated from a digital map, and superposed with route information depicting a navigation route. The route information may be pre-recorded, but typically it is the result of a route-planning algorithm executed by the navigation device using suitable software. The navigation device may also include a position determining system (such as Global Positioning System (GPS)) for determining the current real-time position of the navigation device, and for dynamically adjusting the map view in accordance with the determined current position. Various types of map views are known including:

(i) A two-dimensional-based mapview that includes information in two-dimensions at ground level. For example, roads and buildings are represented by the shape of their footprints on the ground. Such two-dimensional information may be viewed as a plan (i.e. looking vertically downwardly on the map, in the same manner as a traditional paper map), or in artificial perspective as if viewing a traditional flat paper map from a perspective angle. However, in either case, the map view is "flat" in the sense that the information is only two-dimensional ground level information.

(ii) A three-dimensional-based perspective elevation view in which one or more digital map features or objects are presented in three dimensions. For example, a building is depicted showing the building's facades and a building height, which is a closer representation to the real world.

Many users find a three-dimensional perspective elevation view to be more intuitive than a two-dimensional flatview, especially when viewing the map at a relatively large display scale and/or for a built-up area during navigation. This is because the three-dimensional perspective and height information of objects depicted in the display more closely resembles these features as seen by the eye. For example, a person walking or driving at ground level sees building facades of certain height, rather than an abstract footprint of the building on the ground. The three-dimensional perspective information may therefore provide many users with more intuitive visual cues that aid the user to matching the display to what the user is seeing, and to follow the navigation route.

The above is especially true for a portable navigation device (PND), such as for handheld or in-vehicle use. In the case of in-vehicle use, a highly intuitive navigation display is desired that (i) provides the driver with current navigation information, (ii) provides an indication of the future route, so that driver can drive and position the vehicle appropriately, and (iii) avoids burdening the driver's attention, in order to allow the driver to drive the vehicle safely.

While a three-dimensional perspective elevation view is desirable for its intuitiveness, it can nevertheless result in additional display complications in terms of what the user is able to see in the map view. For example, the amount of three-dimensional information depends on the elevation angle at which the map view is generated. An elevation angle of 90 degrees corresponds to looking vertically downwards on to the map (as a two-dimensional plan), and so there is no three-dimensional perspective of each map object, and no obscuring of one map object in front of another. As the elevation angle is decreased, the map objects take on increasing three-dimensional height and form, and the amount of perspective increases. A tall map object, such as a building, may obscure another item of map information in the display, such as a lower building or a road at ground level. This situation could be remedied by increasing the elevation angle, until such obscuring no longer occurs, but this would necessarily reduce the amount of three-dimensional information in the view, and thereby reduce the benefit in terms of the intuitiveness of the view.

The present invention has been devised to address these contradictory issues.

SUMMARY OF THE INVENTION

In pursuit of this aim, a presently preferred embodiment of the present invention provides a technique for generating a display image including a map view and route information, the map view being a three dimensional perspective elevation view, and the method comprising:

(a) determining, from height information associated with a map object to be displayed in the display image, whether the object obscures a line of sight to the route information in the three dimensional perspective elevation; and (b) displaying the map object in a format that is dependent on whether the map object is determined to obscure the line of sight.

This technique may be defined as a method, or an apparatus implementing the technique, or a computer program which implements the technique when executed.

When the map object is determined to obscure the line of sight to the route information, the map object may be displayed in a format that permits at least partial viewing of the route information behind the map object. For example, the map object may be displayed in an at least partly transparent format, or as a wire frame format.

Features and advantages of the invention include (i) the ability to present a three-dimensional perspective elevation view in which the route information remains at least partly visible even when the three-dimensional shape of a map object might otherwise obscure the route information, and (ii) avoiding the contradictory issues described above. Other features and advantages of the invention will become apparent from the following description of preferred embodiments. While features believed to be of significance have been identified above and in the appended claims, the Applicant claims protection for any novel feature or idea described herein and/or illustrated in the drawings, whether or not emphasis has been placed thereon.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention are now described with reference to any system for generating a digital map display (in particular, a three-dimensional perspective elevation) on which is superposed route information. Firstly, preferred techniques associated with the invention are described, followed by example apparatus for implementing the invention.

Figure 1:
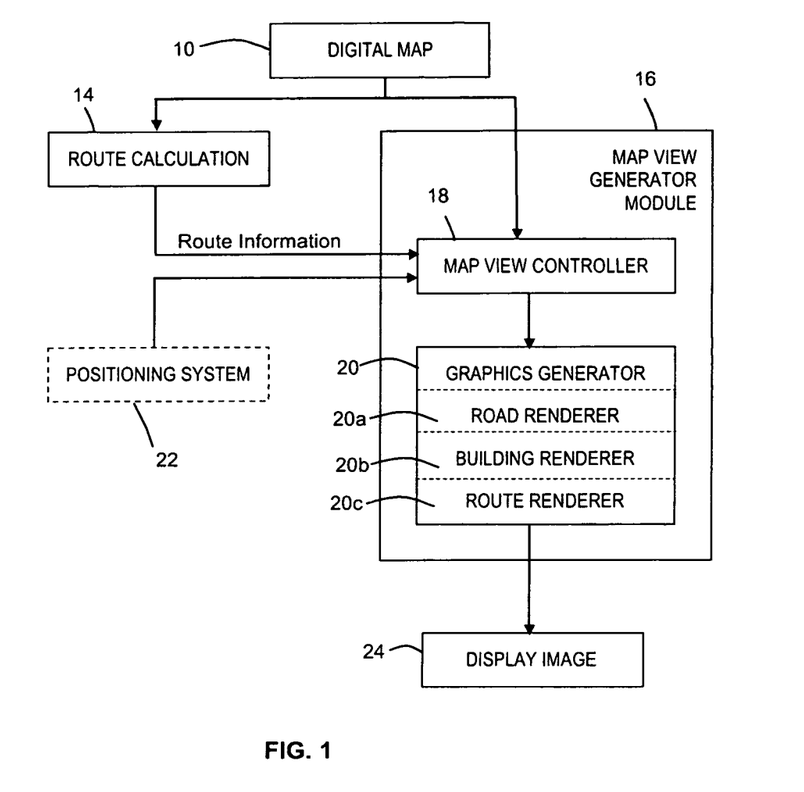
FIG. 1 is a schematic illustration showing information flow for generating a map view in a first embodiment.
Figure 2:
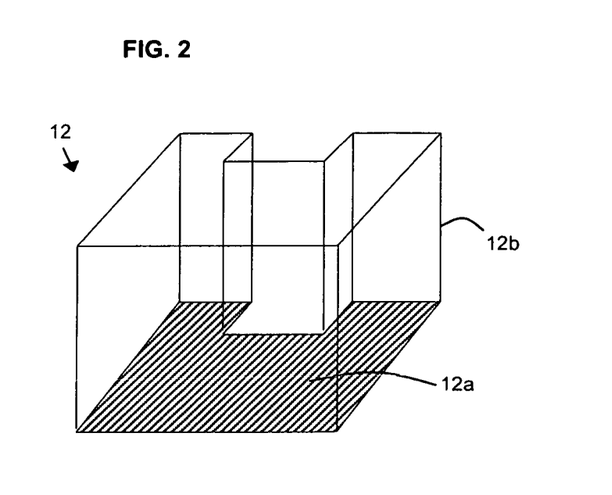
FIG. 2 is a schematic illustration depicting information stored in a digital map for a three-dimensional map object.

FIG. 1 depicts schematically information flow used in a first embodiment, for processing information from a digital map 10, to generate a display image 24 including a map view and superposed route information within the map view. It will be appreciated that FIG. 1 is not intended to represent a limiting architecture for implementing the invention. Instead, it merely represents an example of information flow between various processing stages. The digital map 10 stores information representing, amongst other things, the positions of roads, and other map objects such as buildings. At least some of the map objects are stored with three dimensional information, including the height of the map object. FIG. 2 shows an example of a map object in the form of a building 12. The building is represented in the digital map 10 as first information 12a defining the shape of the building's footprint on the ground, and second information 12b defining the height of the building. The first information 12a may represent a sequence of connected points, and typically defines a closed shape (although the shape may have one or more interior voids representing, for example, an open area or courtyard inside the building). This type of representation enables the building shape to be stored in a highly compressed form, assuming that the building has a regular shape that is a uniform projection of its ground footprint. The building can be displayed relatively easily in three dimensions in a map view by projecting the ground footprint 12a to the height 12b of the building, and rendering the facades of the structure with suitable colour or shading to depict a solid three-dimensional structure. Other three-dimensional shapes or important landmarks may be represented more accurately, for example, by three-dimensional wire mesh information.

Returning to FIG. 1, information from the digital map 10 is supplied to a route calculation module 14 and to a map view generator module 16. The route-calculation module 14 is configured to plan a navigation route between a geographical start position and a geographical end position selected by a user. The user may also provide additional route criteria, such as passing through one or more intermediate locations selectable by the user, or for using certain types of road or other transportation routes. The route-calculation module 14 provides the calculated route information to the map view generation module 16 for superposing the route information in the map view for display. The map view generation module 16 typically comprises sub-modules including, by way of example, a map view controller 18, and a graphics generator 20 responsive to the controller 18. The map view controller 18 manages a map view, by controlling which information is retrieved from the digital map 10, how the information is to be displayed as the map view, and how the route information is to be superposed in the map view. For creating a three dimensional perspective elevation view, the controller 18 also manages the elevation height and elevation viewing angle at which the perspective view is to be created, compared to ground level. The map-view controller module 16 also dynamically controls a location "window" on to the digital map (e.g. the portion of the map displayed in the map view). For example, the location window may depend on the current real-time position of a user as may be determined by an optional position determining module 22, for example, a GPS or other satellite/wireless signal based positioning system. Alternatively, the location window may be a location selected by the user. The graphics generator 20 includes one or more graphics engines for generating, or composing, the display image 24, pixel-by-pixel, on the basis of the map view information managed by the controller 18. The graphics engines may include, or execute commands to implement, a road renderer 20a, a building renderer 20b, and a route information renderer 20c for superposing the route information in the map view, as well as other custom graphics commands or engines.

Figure 3:
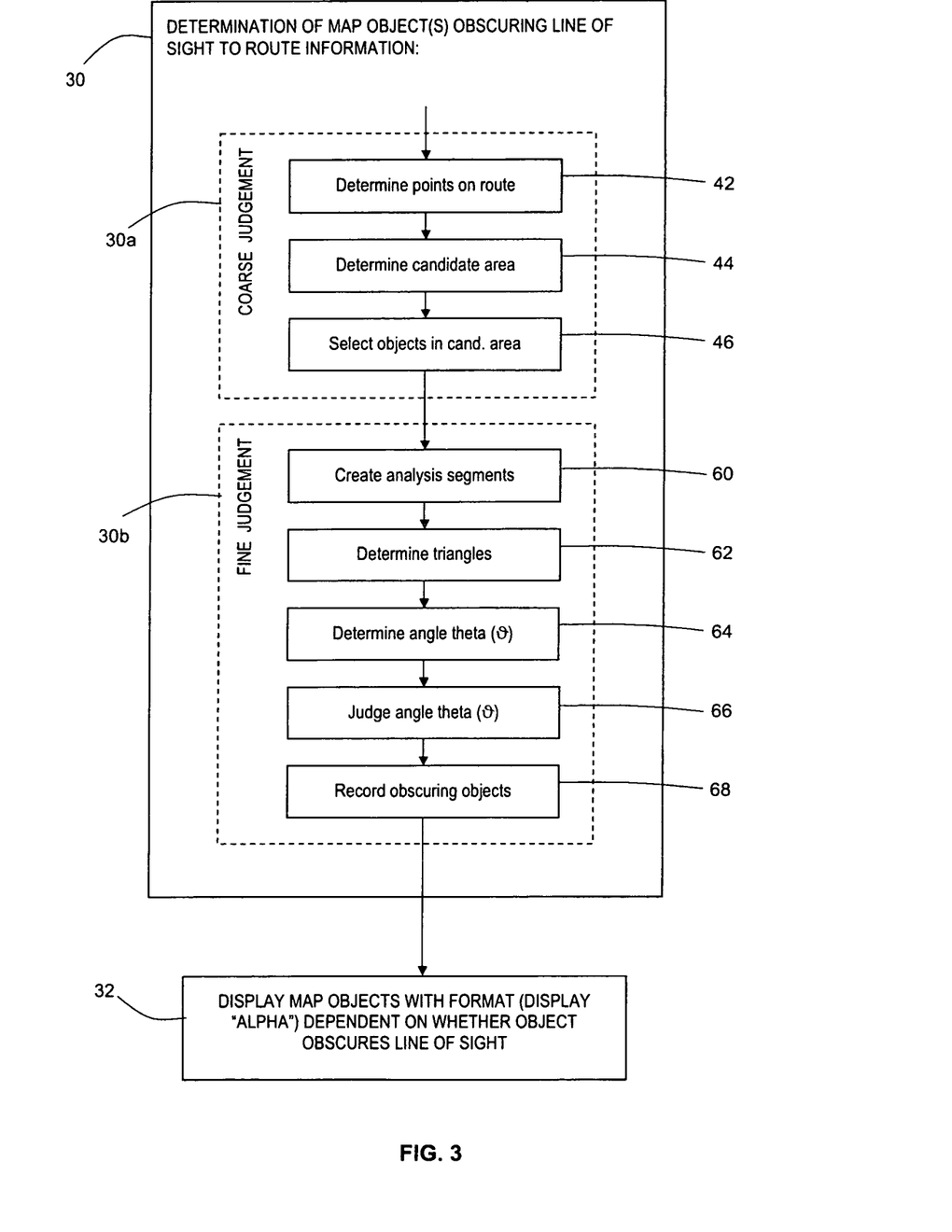
FIG. 3 is a schematic flow diagram showing a first technique for assessing obscuring of the line of sight by map objects, and adjustment of the display format of the map object.

Referring to FIG. 3, a feature of the present embodiment is the implementation of a technique for managing generation of a three-dimensional perspective elevation view by generally: (i) determining (stage 30) whether a map object, such as a building, obscures a line of sight to route information in the three dimensional perspective elevation view, and (ii) displaying (stage 32) the map object in the map view with a display format that depends on the determination of whether the line of sight is obscured. FIGS. 3-6 illustrate this technique in more detail.

Figure 4:
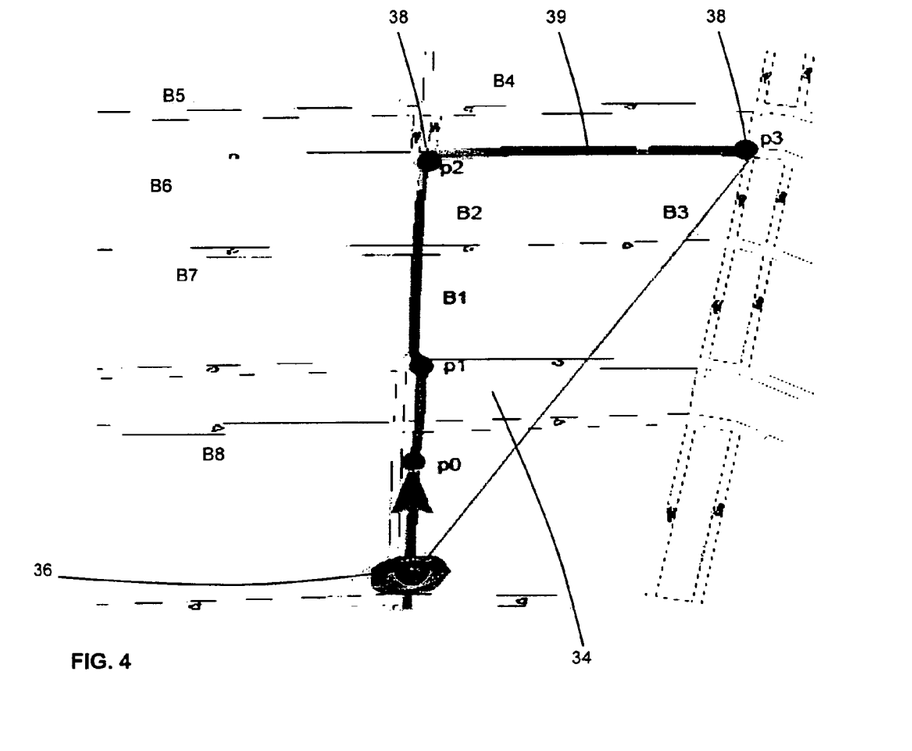
FIG. 4 is a schematic illustration of the function of a first coarse assessment step.

The step 30 of determining whether a map object obscures a line of sight is divided into two steps 30a and 30b. Step 30a applies a coarse assessment to exclude from consideration map objects that are not positioned between (i) a viewing or camera position 36 and (ii) the position of the route information 40 in the map view. Step 30b applies a finer assessment for each remaining (i.e. non-excluded) map object. Although two steps 30a and 30b are executed, the ability of step 30a to exclude irrelevant map objects quickly and easily reduces the number of map objects for which the more burden-some step 30b is executed. In more detail:

Referring to FIGS. 3 and 4, step 30a functions by determining a candidate area 34 with respect to the camera viewing position 36 and the navigation route 40. For each map object, an assessment is made as to whether any of the points that make up the object are inside the candidate area 34. In the case of a regular shaped map object (such as the building of FIG. 2), the assessment may be made for each corner point of the structure. In the case of an irregular shaped map object, it is computationally easiest to consider a regular shaped bounding box encompassing the object, and to assess the corner points of the bounding box. Map objects having a display point inside the candidate area 34 are identified for processing by step 30b, because these objects lie between the camera viewing position 36 and the navigation route 40 and might risk obscuring the navigation route 40 in the display image. Map objects wholly outside the candidate area 34 are excluded, because such objects have no risk of obscuring the navigation route 40. The candidate area 34 has a polygonal shape defined by the camera viewing position 36 and a plurality of points 38 along the navigation route 40. Although it is possible to consider a single irregular shaped polygon with more than two points 38, it may be computationally efficient to process the candidate area 34 in the form of triangle shaped segments defined by only two points 38 along the navigation route 40 which define a straight-line portion 39 of the navigation route between them. The points 38 are preferably waypoints or nodes depicting a significant point, or change in direction occurring, in the navigation route 40. The two points 38 are preferably sequential along the navigation route 40. The process is repeated for each triangular segment until all of the points 38 have been processed. The points 38 are selected until (i) the end of the navigation route is reached, and/or (ii) the navigation route exits the edge of the map view (i.e. reaches the edge of the display image), and/or (iii) the navigation route extends more than a certain range from the camera viewing position 36 (for example, up to a range of about 2000 m). Beyond this range, it may be considered unnecessary to fix viewing obscurities, as the accuracy of the display may be limited by other factors, such as reduced image scale with respect to the display resolution. In FIG. 3, step 30a comprises: sub-step 42 that determines the positions 38 along the navigation route 40; sub-step 44 that determines the candidate area(s) 34; and sub-step 46 that creates a record of each map object within, or overlapping, the candidate area(s) 34. Only those map objects recorded at sub-step 46 continue to be processed by step 30b; other map objects are excluded from further consideration for the purposes of determining whether the route information is obscured. For example, in FIG. 4, buildings B1, and B2 and B3 would be selected in step 30a for further consideration by step 30b. In contrast, buildings B4-B8 would be excluded, thereby reducing the processing burden for step 30b.

Figure 5:
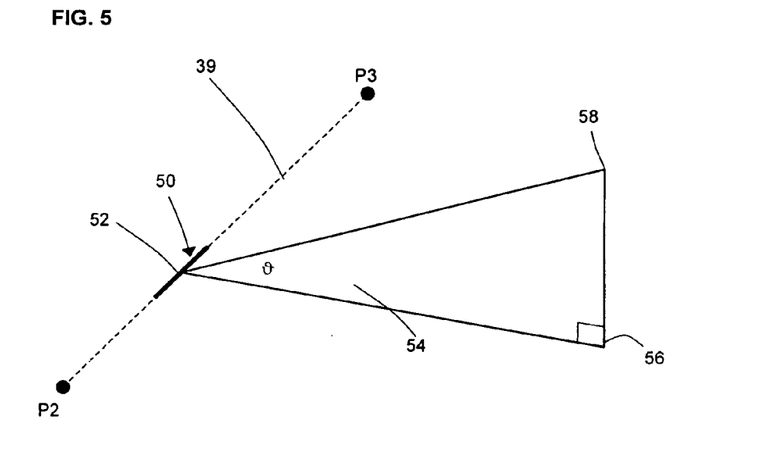
FIG. 5 is a schematic illustration of the function of a second finer assessment step.

Referring to FIGS. 3 and 5, step 30b functions by assessing a viewing elevation angle that is needed to see over each map object in the candidate area 34, as a function of the map object's position and height. This assessment is made by dividing the straight line portion 39 between the points P2 and P3 into sub-segments 50 of a predetermined segment length, such as about 5 m. From a certain point 52 on the segment 50 (such as the midpoint of the segment 50), a hypothetical right-angled triangle 54 is assessed. The triangle 54 has its apexes defined by the point 52, the map object point 56 found to be inside the candidate area 34 at (or projected to) ground level, and the same map object point 58 at (or projected to) the height of the map object. Using trigonometry, an elevation angle (theta) is calculated that corresponds to the line of sight angle needed to see over the map object. If the current viewing angle with respect to the camera position 36 is less than the angle theta, then the map object is considered to obscure the route information 40. If the current viewing angle equals, or is greater than the angle theta, then the map object is considered not to obscure the route information 40. In FIG. 3, step 30b comprises: sub-step 60 that creates the segments 50; sub-step 62 that determines the hypothetical triangles 54; sub-step 64 that determines the angle theta; sub-step 66 that compares the current viewing elevation angle with the angle theta; and sub-step 68 that records map objects for which the viewing elevation angle is less than the angle theta for the map object, indicating that the map object does obscure the route information 40. For example, in FIG. 4, buildings B1 and B3 may now be excluded as a result of the finer assessment step 30b, and building B2 may be assessed as obscuring the line of sight in the region of P2.

At stage 32, the display format of each map object is controlled in dependence on the determination of whether the map object obscures the line of sight to the route information 40. In the current embodiment, the transparency of the object is varied in the map view. The transparency is controlled by an "alpha" parameter. The alpha parameter may vary between 0 (fully transparent) and 1 (fully opaque). A map object that does not obscure the line of sight is displayed opaquely (alpha=1). A map object that does obscure the line of sight is displayed at least partly transparently, with an alpha parameter less than 1, preferably less than 0.8, or less than 0.6, for example, about 0.4. As an alternative to setting a fractional alpha parameter, the map object may be displayed as a three-dimensional wire cage form, with fully transparent walls (alpha=0). Bearing in mind that the display image is updated in real time, and that a map object may change in the display from "not obscuring" to "obscuring" depending on changes to the display orientation, changes in the camera elevation, or relative movement along the navigation route, it is preferable to avoid abrupt changes of transparency of a map object that is already displayed in the map view. Instead, a "desired alpha" parameter is set, and the actual alpha used to display the map object in the map view is varied progressively, so that the object changes transparency progressively, for example, over a period of about half a second.

Figure 6:
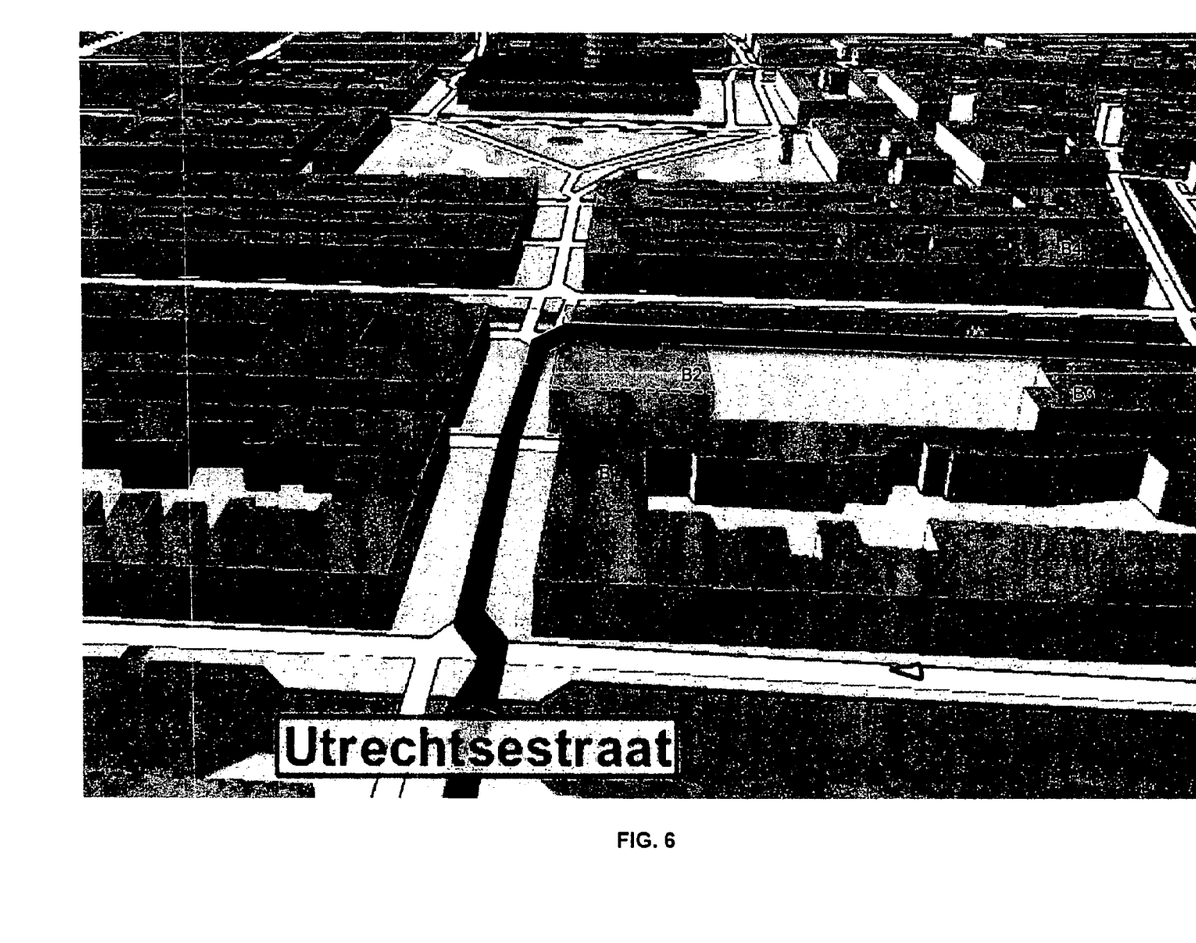
FIG. 6 is a schematic screenshot of a map view generated using the technique of the first embodiment.

FIG. 6 shows a display image generated using the above techniques. Buildings B1 and B3 (amongst others) that do not obstruct the line of sight to the route information 40 are displayed fully opaquely. Building B2 that does obstruct the line of sight to the route information 40 is displayed partly transparently, thereby permitting the route information 40 to be seen clearly through the building B2. (In FIG. 6, this partial transparency is depicted by broken lines.) This enables a full three-dimensional perspective elevation view to be generated, and the user to benefit from the intuitiveness associated with such a view, without risk of the route information 40 being obscured in the view.

Figure 7:
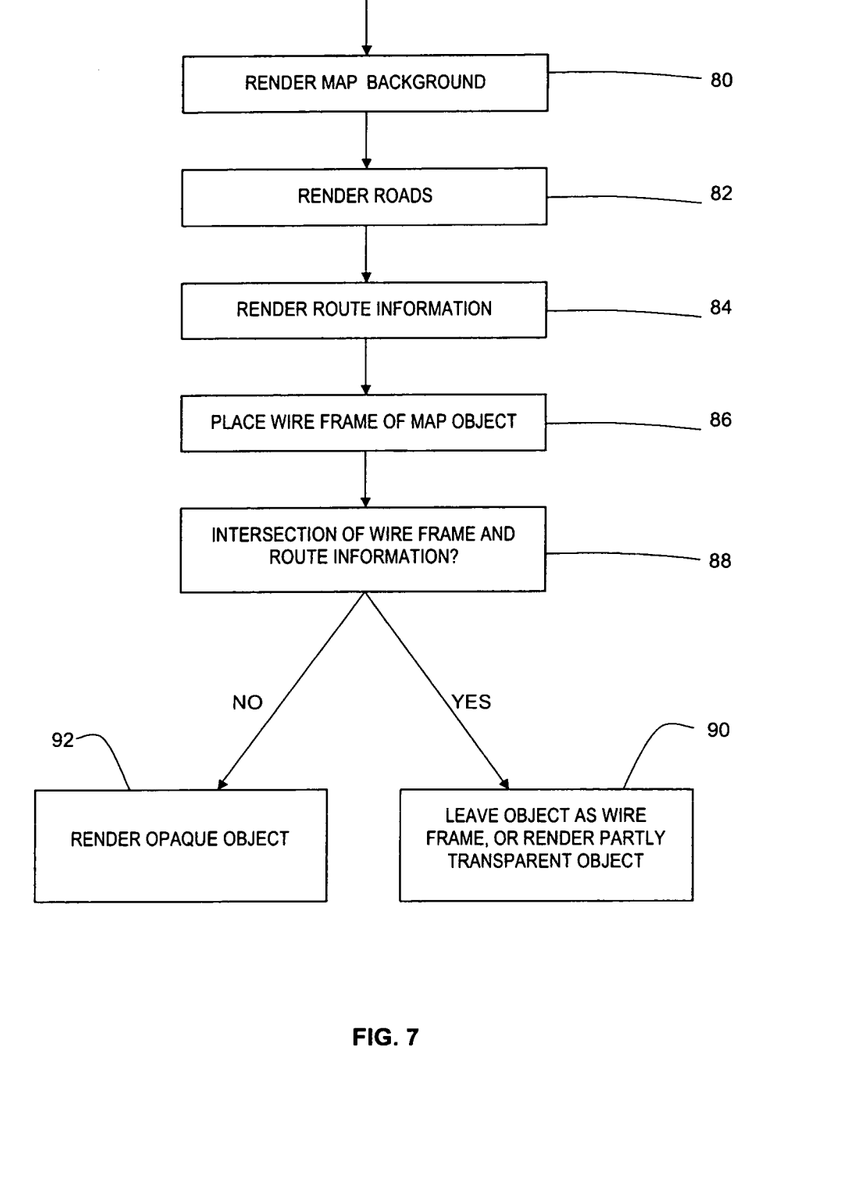
FIG. 7 is a schematic flow diagram illustrating an alternative display technique.

The above technique is typically performed by the map view controller 18 (FIG. 1), and can assess map objects before the map objects are placed and rendered by the graphics generator 20. This provides maximum versatility, because the assessment of whether the line of sight is obscured is independent of the particular rendering technique implemented by the graphics generator 20. FIG. 7 illustrates an alternative and perhaps less refined technique that uses the graphics generator 20 to detect and compensate for such obscuring, still using the techniques of the present invention. In FIG. 7, the map view is created by rendering the map background (step 80), roads (step 82), the route information (step 84), before three dimensional map objects, in this hierarchical order. This means that the route information 40 is defined in the map view before the three-dimensional map objects are defined. Upon placing each map object (step 86), a wire cage frame of the map object is first placed in the map view. A judgement is made (step 88) as to whether any of the display points depicting the wire cage intersect, or traverse, the route information 40 that is already present. Such intersections may be detected as collision or intersection events generated by the respective graphics engine. The route information 40 may be rendered in a unique colour, and intersection or traversal of the route information 40 can be detected by "collision" with this colour. If the wire cage does intersect or traverse the route information 40, this indicates that the map object obscures the line of sight to the route information, and the map object is then displayed or rendered (step 90) in an at least partially transparent format, or the map object is left as a wire cage object if desired. If at step 88 the wire cage does not intersect or traverse the route information 40, this indicates that there is no obscuring of the line of sight, and the map object is then displayed or rendered opaquely (step 92).

Figure 8:
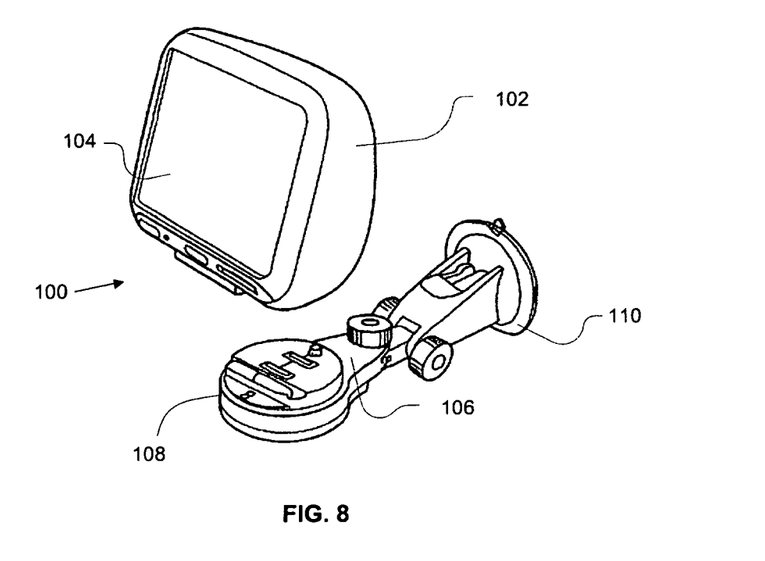
FIG. 8 is a schematic perspective view of a navigation apparatus.
Figure 9:
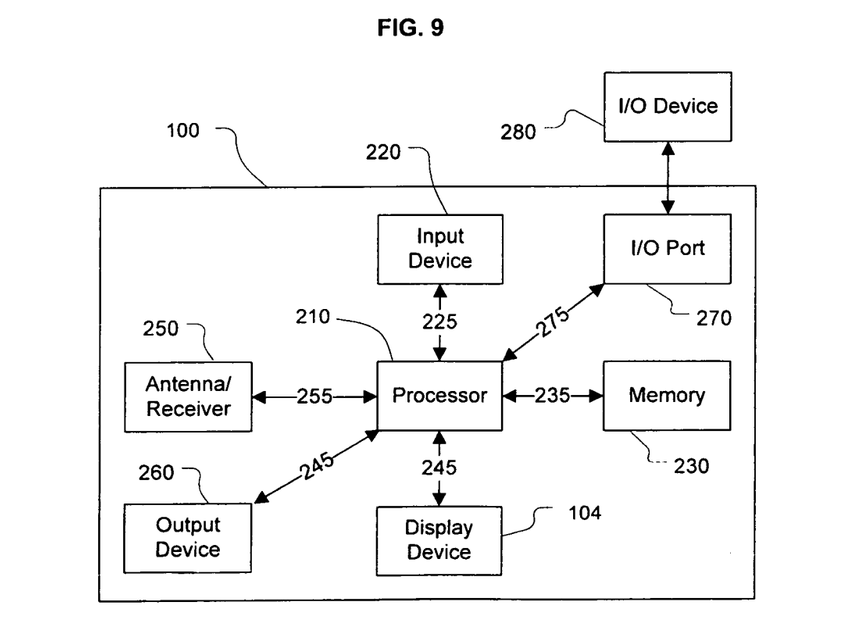
FIG. 9 is a schematic block diagram showing the navigation apparatus hardware.
Figure 10:
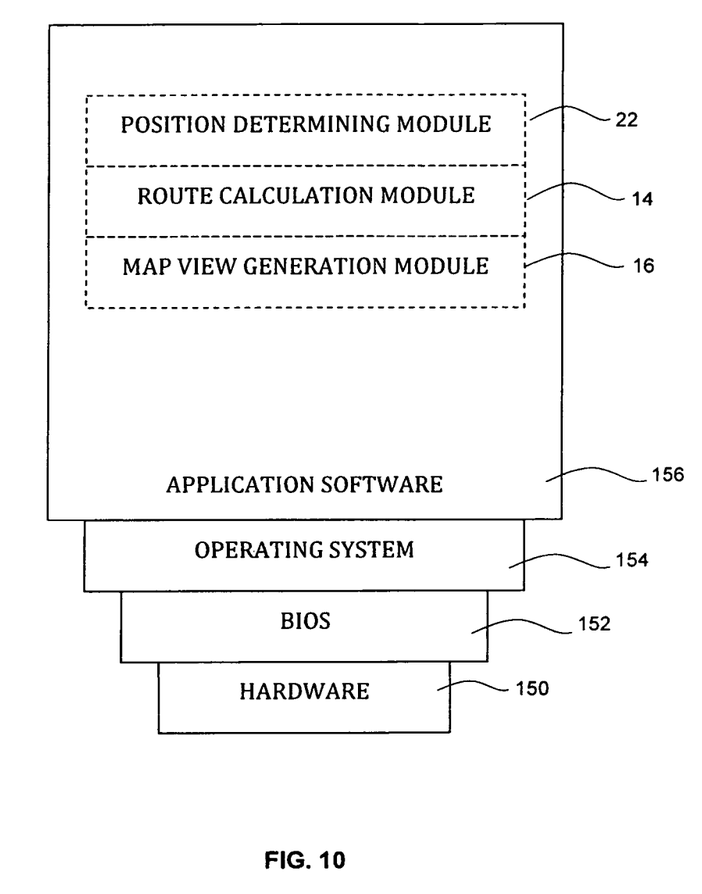
FIG. 10 is a schematic diagram showing a functional operative relation established by the hardware and software.

Having described the preferred functional techniques, FIGS. 8-10 now illustrate a physical apparatus or system for implementing one or more of these techniques. The system may comprise an automomous device, such as a portable navigation device (PND), an in-vehicle navigation device, a portable map viewer, a device including a positioning system (for example, a satellite based positioning system such as a Global Positioning System (GPS)), a portable digital assistant (PDA), a portable computer, or non-portable computer. Alternatively, the system may comprise a server storing the digital map, and a remote terminal or computer configured to generate a display of the digital map based on information received from the server over one or more networks, such as an internet or intranet.

FIG. 8 depicts an example embodiment in the form of a PND 100. A PND is chosen as this represents the most challenging design in which design constraints such as confined display size, limited processing power and speed, as well as weight and power supply limitations, are most acute. The PND 100 generally comprises a housing 102 accommodating the PND's electronic hardware, including a display screen 104. The PND is made suitable for in-vehicle use by means of a dock bracket 106. The dock bracket 106 includes a coupling part 108 for releasable or separable docking engagement with a complementary coupling part on the housing 102. The bracket 106 further includes a mounting element 110, such as a suction cup or an adhesive pad, for attaching the bracket 106 to a suitable surface of the vehicle (not shown).

FIG. 9 is an illustrative representation of electronic components 152 of the navigation device 100, in block component format. It should be noted that the block diagram of the navigation device 100 is not inclusive of all components, but is only representative of many example components.

The navigation device 100 includes a processor 210 connected to an input device 220 and the display screen 104. The input device 220 can include a keyboard device, voice input device, touch panel and/or any other known input device utilised to input information; and the display screen 104 can include any type of display screen such as an LCD display, for example. In a particularly preferred arrangement the input device 220 and display screen 104 are integrated into an integrated input and display device, including a touchpad or touchscreen input so that a user need only touch a portion of the display screen 104 to select one of a plurality of display choices or to activate one of a plurality of virtual buttons.

The navigation device may include an output device 260, for example an audible output device (e.g. a loudspeaker). As output device 260 can produce audible information for a user of the navigation device 100, it is should equally be understood that input device 220 can include a microphone and software for receiving input voice commands as well.

In the navigation device 100, processor 210 is operatively connected to and set to receive input information from input device 220 via a connection 225, and operatively connected to at least one of display screen 104 and output device 260, via output connections 245, to output information thereto. Further, the processor 210 is operatively connected to memory 230 via connection 235. The memory 230 can include any suitable media, including non-volatile memory and/or volatile memory, writable and/or read-only memory, semiconductor memory (such as RAM and/or FLASH), magnetic memory, such as a magnetic disc, and optical memory, such as an optical disc. The memory 230 stores various information including executable software, and the digital map 10 discussed above.

The processor 210 is further configured to receive/send information from/to input/output (I/O) ports 270 via connection 275, wherein the I/O port 270 is connectible to an I/O device 280 external to the navigation device 100. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 100 and the Internet or any other network for example, and/or to establish a connection to a server via the Internet or some other network for example.

FIG. 9 further illustrates an operative connection between the processor 210 and an antenna/receiver 250 via connection 255, wherein the antenna/receiver 250 can be configured for receiving positioning system signals (such as GPS signals or other radio or satellite signals) from which the current real-time position of the navigation device 100 can be determined in a known manner. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 9 are powered by power sources (not shown) in a conventional manner. As will be understood by one of ordinary skill in the art, different configurations of the components shown in FIG. 9 are considered to be within the scope of the present application. For example, the components shown in FIG. 9 may be in communication with one another via wired and/or wireless connections and the like. Also, although the connections are shown as independent of each other, some or all of the connections may share one or more communication buses.

Referring to FIG. 10, the processor 210 and memory 230 cooperate to establish a BIOS (Basic Input/Output System) 150 that functions as an interface between the functional hardware components 152 of the navigation device 100 and the software executed by the device. The processor 210 then loads from memory 230 an operating system 154 which provides an environment in which application software 156 can run.

Depending on the functionality provided by the navigation device 100, the application software 156 may include one or more of: the position determining module 22; the route-calculation module 14; and the map view generation module 16 implementing a three-dimensional perspective elevation in which the display format for a three dimensional map object is controlled in dependence on whether the map objected is judged to obscure a line of sight to route information in the map view.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of generating a display image including a map view and route information, the map view being a three dimensional perspective elevation view, the method comprising:
    determining, from height information associated with a map object to be displayed in the display image, whether the object obscures a line of sight to the route information in the three dimensional perspective elevation; and
    displaying the map object in an at least partly transparent format that is dependent on whether the map object is determined to obscure the line of sight, wherein the display smoothly using a variable transparency parameter associated with the map object.

2. The method of claim 1, wherein the determining comprises: in response to determining that that the map object obscures the line of sight, displaying the map object in a format that permits at least partial viewing of the route information behind the map object.

3. The method of claim 1, wherein the determining comprises: a coarse judgement step of identifying one or more map objects that are at respective positions between a camera view position and the route information, and excluding other map objects, a fine judgement step of assessing, for each of the map objects identified in the coarse judgement step, whether the map object obstructs the line of sight, based on (i) a height of the map object, and (ii) the respective position of the map object between the camera view position and a route information.

4. The method of claim 3, wherein the coarse judgement step comprises: identifying a candidate area defined as a polygon having an apex at a camera viewing position, and two or more additional corners defined by points on the route information, wherein the camera viewing position depicts a viewing position with respect which the three-dimensional perspective elevation is aligned.

5. The method of claim 4, wherein the polygon is a triangle defined by the camera viewing position and two points on the route information.

6. The method of claim 4, wherein the fine judgement step comprises determining an elevation view threshold angle that would be needed for an unobstructed line of sight over the map object, and judging whether a current elevation angle for the map view satisfies said threshold for unobstructed line of sight.

7. The method of claim 6, wherein the determining of an elevation view threshold angle comprises:
    dividing into analysis segments a geometric line between the points on the route information;
    for each segment, determining the elevation angle that represents the angle of intersection between the hypotenuse and adjacent edges of a right-angled triangle constructed between a point on the segment, a point of the map object at map ground level, and the same point of the map object at the height of the map object.

8. The method of claim 1, further comprising ignoring map objects whose distance from the camera view position exceeds a predetermined range threshold.

9. A computer program product, comprising executable software which, when executed by a computer processor, implements the method as claimed in claim 1.

10. A storage medium containing or carrying the computer program product of claim 9.

11. Route navigation apparatus configured to generate a display image comprising a three-dimensional perspective elevation map view superposed with route information, the apparatus comprising:
    a display device to display a three-dimensional map object in an at least partly transparent format that is dependent on whether the map object is determined to obstruct a line of sight to the route information in the map view, wherein the display device smoothly using a variable transparency parameter associated with the map object.

12. The apparatus of claim 11, wherein the display device displays a three-dimensional map object in generally opaque display format in a case that the three-dimensional map object is determined not to obstruct the line of sight to route information.

13. The apparatus of claim 12, wherein the second display format permits route information behind the object in the map view, to be visible through the object.

14. The method of claim 5, wherein the fine judgement step comprises determining an elevation view threshold angle that would be needed for an unobstructed line of sight over the map object, and judging whether a current elevation angle for the map view satisfies said threshold for unobstructed line of sight.

* * * * *

UNITED STATES PATENT AND TRADEMARK OFFICE
CERTIFICATE OF CORRECTION

PATENT NO. : 8,525,704 B2
APPLICATION NO. : 12/736406
DATED : September 3, 2013
INVENTOR(S) : Pieter Geelen et al.

Page 1 of 1

It is certified that error appears in the above-identified patent and that said Letters Patent is hereby corrected as shown below:

On the title page, item (73) Assignee: Tomtom International B.V., should read -- TomTom International B.V. --.

In the Claims:

Column 9, line 17, claim 1 should read: display -- progressively changes the map object's transparency, whereby the map view changes -- smoothly using a variable transparency parameter associated with the map object.

Column 10, line 30, claim 11 should read: wherein the display device progressively changes the map object's transparency, whereby the map view changes smoothly using a variable transparency parameter associate with the map object.

Signed and Sealed this
Third Day of December, 2013

Margaret A. Focarino
*Commissioner for Patents of the United States Patent and Trademark Office*